United States Patent Office 3,170,924
Patented Feb. 23, 1965

3,170,924
1(OR 3)-AMINOALKYL-1H-INDENO[2,1-d]-
PYRIMIDINES
Pierre Marie Vanhoof, Brussels, Belgium, assignor to Manufacture de Produits Pharmaceutiques A. Christiaens Societe Anonyme, Brussels, Belgium
No Drawing. Filed Mar. 27, 1961, Ser. No. 98,319
Claims priority, application Great Britain, Apr. 1, 1960, 11,659/60
27 Claims. (Cl. 260—247.5)

The present invention relates to new nitrogenous heterocyclic compounds and their preparation.

The invention provides new 1-H-9-cyano-indeno[2,1-d]-pyrimidine and 3 - H - 9 - cyano-indeno[2,1-d]-pyrimidine, substituted on the nitrogen atom occupying the 3 position or on the nitrogen atom occupying the 1 position of the pyrimidine ring. The compounds have the following general formulae:

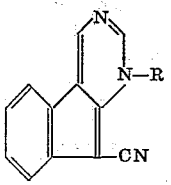   (I)

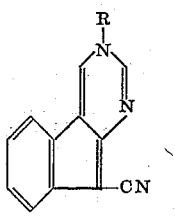   (I')

in which R signifies an alkyl, aryl, alkylaryl, allyl, alkyleneamino, alkylenecarboxy, alkylene carbamyl, hydroxyalkylene radical, each of which may be substituted, particularly the following radicals:

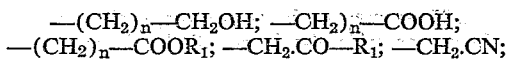

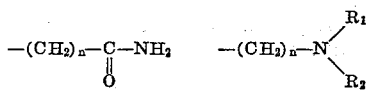

wherein $R_1$ and $R_2$, which can be identical or different, signify an alkyl radical and may form together a heterocyclic ring, whilst $n$ is a whole number.

The following compounds can be cited among the new, nitrogen heterocyclic compounds according to the invention, by way of illustration and non-limiting examples only:

1-H-9-cyano-1-methyl-indeno[2,1-d]pyrimidine
(Formula I: R=—$CH_3$).
3-H-9-cyano-3-methyl-indeno[2,1-d]pyrimidine
(Formula I': R=—$CH_3$).
1-H-9-cyano-1-carboxymethyl-indeno[2,1-d]pyrimidine
(Formula I: R=—$CH_2COOH$).
1-H-9-cyano-1-carboxyethyl-indeno[2,1-d]pyrimidine
(Formula I: R=—$CH_2$—$CH_2$—COOH).
1-H-9-cyano-1-methylenecarboxyethyl-indeno[2,1-d]-pyrimidine (Formula I: R= —$CH_2$—$\overset{O}{\underset{\parallel}{C}}$O—$C_2H_5$)

1-H-9-cyano-1-ethylenecarboxyethyl-indeno[2,1-d]-pyrimidine, and 3-H-9-cyano-3-ethylenecarboxyethyl-indeno[2,1-d]pyrimidine (Formulae I and I': R=—$CH_2$—$CH_2$—$COOC_2H_5$).
1-H-9-cyano-1-(γ-hydroxypropyl)-indeno[2,1-d]pyrimidine and 3-H-9-cyano-3-(γ-hydroxypropyl)-indeno[2,1-d]pyrimidine (Formula I: R=—($CH_2$)$_3$OH).
1-H-9-cyano-1-(δ-hydroxybutyl)indeno[2,1-d]pyrimidine and 3-H-9-cyano-3-(δ-hydroxybutyl)-indeno-[2,1-d]pyrimidine (Formula I: R=—($CH_2$)$_3CH_2$OH).
1-H-9-cyano-1-(β-hydroxyethyl)-indeno[2,1-d]pyrimidine and 3-H-9-cyano-1-(β-hydroxyethyl)indeno-[2,1-d]pyrimidine (Formula I: R=—$CH_2CH_2$—OH).
1-H-9-cyano-1-cyanomethyl-indeno[2,1-d]pyrimidine and 3-H-9-cyano-3-cyanomethyl-indeno[2,1-d]pyrimidine (Formula I: R=—$CH_2CN$).
1-H-9-cyano-1-(β-oxo-β-phenyl)-ethylene-indeno-[2,1-d]pyrimidine and 3-H-9-cyano-3-(β-oxo-β-phenyl)ethylene-indeno[2,1-d]pyrimidine (Formula I: R= —$CH_2$—CO—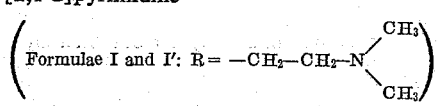)

1-H-9-cyano-1-allyl-indeno[2,1-d]pyrimidine and 3-H-9-cyano-3-allyl-indeno[2,1-d]pyrimidine (Formulae I and I': R=—$CH_2$—CH=$CH_2$).
1-H-9-cyano-1-benzyl-indeno[2,1-d]pyrimidine and 3-H-9-cyano-1-benzyl-indeno[2,1-d]pyrimidine (Formulae I and I': R= —$CH_2$—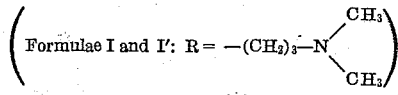)

1-H-9-cyano-1-(methylene-4-pyridyl)-indeno[2,1-d]pyrimidine and 3-H-9-cyano-3-(methylene-4-pyridyl)-indeno[2,1-d]pyrimidine (Formulae I and I': R= —$CH_2$—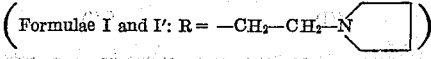)

1-H-9-cyano-1-ethylcrotonato-indeno[2,1-d]pyrimidine and 3-H-9-cyano-3-ethylcrotonato-indeno[2,1-d] pyrimidine (Formulae I and I':

R=—$CH_2$—CH=CH—$COOC_2H_5$)

1-H-9-cyano-1-methylenecarbamyl-indeno[2,1-d]pyrimidine (Formula I: R=—$CH_2$—CO—$NH_2$).
1-H-9-cyano-1-dimethylaminoethyl-indeno[2,1-d]pyrimidine and 3-H-9-cyano-3-dimethylaminoethyl-indeno[2,1-d]pyrimidine (Formulae I and I': R= —$CH_2$—$CH_2$—N$\begin{smallmatrix}CH_3\\CH_3\end{smallmatrix}$)

and the acid addition salts thereof.
1-H-9-cyano-1-dimethylaminopropyl-indeno[2,1-d]-pyrimidine and 3-H-9-cyano-3-dimethylaminopropyl-[2,1-d]pyrimidine (Formulae I and I': R= —($CH_2$)$_3$—N$\begin{smallmatrix}CH_3\\CH_3\end{smallmatrix}$)

and the acid addition salts thereof.
1-H-9-cyano-1-N-pyrrodidinoethyl-indeno[2,1-d]pyrimidine and 3-H-9-cyano-3-N-pyrrolidinoethyl-indeno-[2,1-d]pyrimidine (Formulae I and I': R= —$CH_2$—$CH_2$—N◯)

and the acid addition salts thereof.
1-H-9-cyano-1-diethylaminoethyl-indeno[2,1-d]pyrimidine and 3-H-9-cyano-3-diethylaminoethyl-indeno-[2,1-d]pyrimidine

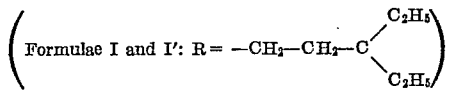

and the acid addition salts thereof.
1-H-9-cyano-1-dibutylaminopropyl-indeno[2,1-d]pyrimidine and 3-H-9-cyano-3-dibutylaminopropyl-indeno-[2,1-d]pyrimidine

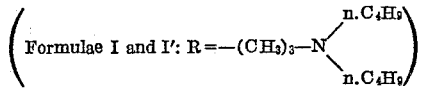

and the acid addition salts thereof.
1-H-9-cyano-1-dipropylaminopropyl-indeno[2,1-d]pyrimidine and 3-H-9-cyano-3-dipropylaminopropyl-indeno[2,1-d]pyrimidine

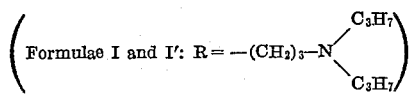

and the acid addition salts thereof.
1-H-9-cyano-1-N-morpholinopropyl-indeno[2,1-d]pyrimidine and 3-H-9-cyano-3-N-morpholinopropl-indeno[2,1-d]pyrimidine

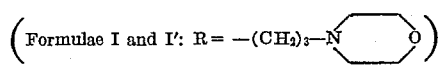

and the acid addition salts thereof.
1-H-9-cyano-1-N-piperidinopropyl-indeno[2,1-d]pyrimidine and 3-H-9-cyano-3-N-piperidinopropyl-indeno-[2,1-d]pyrimidine

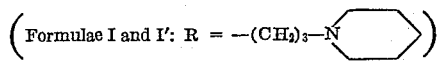

and the acid addition salts thereof.
1-H-9-cyano-1-N-piperidinoethyl-indeno[2,1-d]pyrimidine and 3-H-9-cyano-3-N-piperidinoethyl-indeno-[2,1-d]pyrimidine

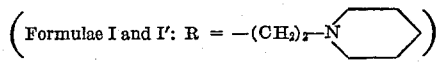

and the acid addition salts thereof.
1-H-9-cyano-1-(piperazinoethyl)-indeno[2,1-d]pyrimidine and 3-H-9-cyano-3-(piperazinoethyl)indeno-[2,1-d]pyrimidine and the acid addition salts thereof.
1-H-9-cyano-1-(piperidinoethyl)-indeno[2,1-d]pyrimidine and 3-H-9-cyano-3-(piperidinoethyl)indeno-[2,1-d]pyrimidine and the acid addition salts thereof.

The invention also includes the preparation of the new compounds of Formulae I and I'. According to the invention, these compounds may be obtained by reaction of an alkylating, arylating or arylalkylating agent or a halide of the formula R—X, in which R has the above meanings and X signifies a halogen atom, with an alkali metal salt of a 1-H-9-cyano-indeno[2,1-d]pyrimidine, or its tautomer 3-H-9-cyano-indeno[2,1-d]pyrimidine, of the formulae:

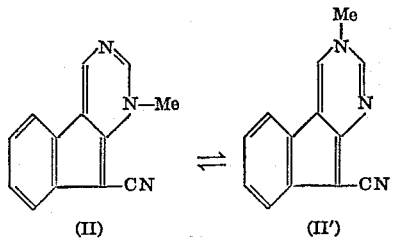

in which Me signifies an alkali metal, such as sodium or potassium.

The reaction for obtaining the compounds of Formula I, starting from compounds of Formula II and a halide of the type R—X can be set out as follows:

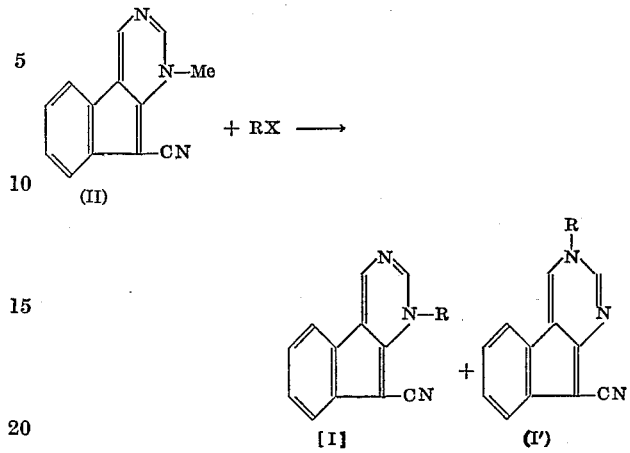

In the process according to the invention, one often obtains a mixture of the compounds of Formulae I and I' the reaction being able to take place at the nitrogen atom in the 3-position or the nitrogen atom in the 1-position.

In order to prepare compounds of Formulae I and I' in which R indicates an alkyl radical, the sodium salt of Formula II can be reacted with a dialkyl sulphate in a strong aqueous alkali solution.

When the preparation of a compound of Formula I or I' is concerned, wherein R signifies an alkylaryl radical, the sodium salt of Formula II is reacted with an alkylaryl chloride, at the boil, in the presence of isopropyl alcohol.

To prepare a compound of Formula I or I' in which R signifies a radical

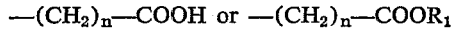

the sodium salt of Formula II is reacted respectively with a halogen-alkyl-carboxylic acid or with an alkyl ester of such an acid in the presence of anhydrous isopropyl alcohol at the boil.

To prepare a compound of Formula I or I', in which R signifies an allyl radical, one reacts a haloalkylating agent, such as a halide of the type

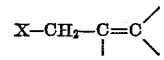

in which X represents a halogen atom, such as allyl chloride, benzyl chloride, 4-chloro-methylpyridine or ethyl β-bromocrotonate, with the sodium salt of Formula II.

Finally, to prepare a compound of Formula I or I', in which R signifies a

radical one reacts a β- or γ-halogenated tertiary amine of the formula

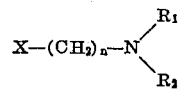

in which X represents a halogen atom, n is equal to 2 or 3, $R_1$ and $R_2$ represent alkyl radicals or form together a heterocyclic ring, with the sodium salt of Formula II. This reaction may take place in an anhydrous alcoholic medium (such as isopropyl alcohol) under reflux or in an alkaline medium (caustic soda—pH: 12–13).

The same compounds of Formulae I and I', in which R signifies a

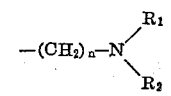

radical, may also be prepared in two steps. In the first step, a compound of the formulae:

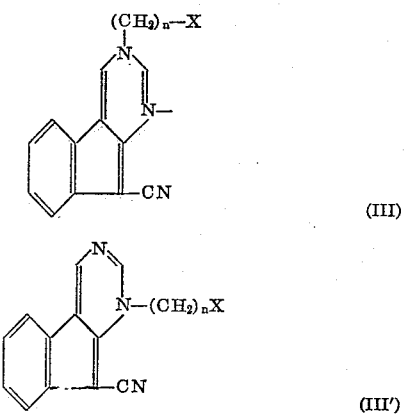

in which X is a halogen atom and n=2 or 3, is first prepared by reacting the sodium salt of Formula II with a β- or γ-dihalogenated aliphatic saturated lower hydrocarbon, such as 1,2-dichloroethane, 1-chloro-3-bromopropane, 1,4-dichlorobutane and the like, or with another alkylating agent containing a halogen such as β-chloro-ethyl p-toluene sulfonate, γ-chloropropyl p-toluene sulfonate, γ-chlorobutyl p-toluene sulfonate and the like. In the second step of this process, a compound of Formula III or III' is reacted with a secondary amine of the formula:

in which $R_1$ and $R_2$ have the above meanings.

The new compounds of Formulae I and I' exert a therapeutic action on the physiological function of the central and peripheral nervous systems and also exert an action on the musculature.

Specific tests have been made in vivo and have shown that several compounds of the Formulae I and I', such as 1-H-9-cyano-1-methylenecarboxy-indeno-[2,1-d]-pyrimidine, 1-H-9-cyano-1-ethylenecarboxy-indeno-[2,1-d]pyrimidine and 1-H-9-cyano-1-(β-hydroxyethyl)-indeno [2,1-d]pyrimidine, have a potentializing action on the sleep induced with phenobarbital, as well as an inhibiting action on the spontaneous motility of mice. Moreover, it has been found that these new heterocyclic compounds have an antipyretic action, whereas they lower the blood pressure.

The compounds of the Formulae I and I', in which R signifies a

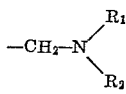

group have the same interesting pharmacodynamic properties, as shown by numerous tests.

The new compounds according to this invention are in general intended for internal administration and may be given perorally or parenterally. Tablets are particularly useful for peroral administration, the active compound being mixed with a solid pharmaceutical carrier. Other possible peroral preparations include capsules and also liquid preparations formulated in a suitable liquid base. Solutions for injection may be made up in sterile pyrogen-free water and the less soluble compounds may be accompanied by dissolving or suspending agents, such as Tween or propylene glycol. It is also possible to administer the compounds per rectum, incorporated into a suppository base such as cocoa butter.

The following examples are given for illustrative purposes:

EXAMPLE 1

Preparation of 1-H-9-cyano-1-methyl-indeno[2,1-d]-pyrimidine and of 3-H-9-cyano-3-methyl-indeno[2,1-d]-pyrimidine 1.92 g. of 1-H-9-cyano-indeno[2,1-d]-pyrimidine are dissolved in 100 cc. of water, containing 0.01 mole of NaOH, while heating towards 65 to 70° C.

0.01 mole of dimethyl sulphate is then added twice to the reaction mixture with an interval of 1 hour. After the addition of the second fraction of dimethyl sulphate, one still keeps the temperature at 75–85° C. for 30 minutes, then after cooling to room temperature, the insoluble material is separated. By acidification, followed by a crystallisation of the filtrate, one recovers approximately 300 g. of unreacted starting materials.

After drying of the insoluble material, one obtains 1.52 g. of a mixture of two compounds which are separated by fractional crystallisation in ethyl alcohol.

Analysis of the first isomer (M. Pt.: 238–239.5° C.).—Found: C=75.86%; H=4.63%; N=19.82%. Calculated: C=75.34%; H=4.38%; N=20.28%.

Analysis of the second isomer.—Found: C=75.50%; H=4.06%; N=20.12%. Calculated:

$$C=75.34\%; H=4.38\%; N=20.28\%$$

EXAMPLE 2

Preparation of 1-H-9-cyano-1-carboxymethyl-indeno [2,1-d]-pyrimidine 4.3 g. (0.02 mole) of the sodium salt of 1-H-9-cyano-indeno[2,1-d]pyrimidine are dissolved in 50 cc. of a 2.5% sodium carbonate solution. After heating in order to assure the dissolution, one adds 2 g. of chloracetic acid, 60 cc. of water and 1.1 g. of $Na_2CO_3$, and then heats under reflux for 1 hour. After cooling and dilution by means of 100 cc. of water, the reaction medium is neutralised to a pH of about 7.5, then acidified to a pH of 3.5 to 4. The precipitate obtained is separated, washed and dried, then recrystallised in dioxan. Yield: 80%. M. Pt.: 234–236° C.

Analysis.—Found:

C=65.74%; H=3.27%; N=16.46%; O=14.51%

Calculated ($C_{14}H_9N_3O_2$):

C=66.93%; H=3.58%; N=16.73%; O=12.75%

EXAMPLE 3

Preparation of 1-H-9-cyano-1-carboxyethyl-indeno [2,1-d]-pyrimidine 4.3 g. (0.02 mole) of the sodium salt of 1-H-9-cyano-indeno-[2,1-d]pyrimidine are dissolved in 50 cc. of a 2.5% sodium carbonate solution. After dissolution under heating, 3.2 g. of β-bromopropionic acid, 60 cc. of water and a quantity of sodium carbonate, sufficient to neutralise the reaction mixture, are added. This mixture is then heated under reflux for 1 hour, then one cools it and dilutes it with 100 cc. of water. One then neutralises to a pH of 7 and filters the precipitate which is recrystallised in dioxan. Yield: 60%. The product melts at 226–227° C., 0.700 mg. of the starting product are recovered by acidification of the filtrate (pH: 3–4), filtration and drying.

Analysis.—Found:

C=67.69%; H=4.41%; N=15.40%; O=12.50%

Calculated:

C=67.96%; H=4.15%; N=15.85%; O=12.07%

EXAMPLE 4

Preparation of 1-H-9-cyano-1-methylene-carboxyethyl-indeno-[2,1-d]pyrimidine 4.3 g. (0.02 mole) of the sodium salt of 1-H-9-cyano-indeno-[2,1-d]pyrimidine and 3.12 g. (0.030 mole) of ethyl chloroacetate are heated under reflux in 50 cc. of anhydrous isopropyl alcohol for 2 hours. After having completely driven off the solvent, the residue is taken up with the aid of 100 cc. of an aqueous solution containing 2.5% of sodium carbonate, then one warms gently to 45–50° C. for 5 minutes, and filters. The precipitate is filtered, then washed to the end of alkalinity and dried. One obtains 3.5 g. of product (yield: 62%) which is recrystallised from benzene. The product melts at 211–213.5° C.

Analysis.—Found:

C=68.7%; H=4.68%; N=15.09%; O=11.53%

Calculated:

C=68.91%; H=4.55%; N=14.99%; O=11.61%

EXAMPLE 5

Preparation of 1-H-9-cyano-1-allyl-indeno[2,1-d]pyrimidine 2.15 g. of the sodium salt of 1-H-9-cyano-indeno-[2,1-d]-pyrimidine, 40 cc. of isopropyl alcohol and 9.9 g. of allyl chloride are mixed, and the mixture is kept at the boil for 2 hours. One then evaporates the solvent to dryness under vacuum, the residue is washed twice with 50 cc. of a 2.5% Na$_2$CO$_3$ solution and 100 cc. of anhydrous benzene are added to the insoluble material. The solution obtained is heated to boiling on the water bath for half an hour. After cooling and filtration, the crystals obtained are dissolved in benzene and the benzene solution obtained is subjected to chromatography on a column (height: 17 cm., diameter: 3 cm.) of basic alumina. After elution and recrystallisation, a total of 1.42 g. of product is obtained.

Analysis.—Found:

C=77.08%; N=4.75%; N=18.30%

Calculated: C=77.23%; N=4.75%; N=18.01%.

After acidification of the carbonated washing liquid and recrystallisation in acetone, one recovers 150 mg. of unchanged product.

EXAMPLE 6

Preparation of 1-H-9-cyano-1-ethylenecarboxy-ethyl-indeno[2,1-d]pyrimidine and of 3-H-9-cyano-3-ethylenecarboxy-ethyl-indeno[2,1-d]pyrimidine A mixture of 11.4 g. (0.053 mole) of the sodium salt of 1-H-9-cyano-indeno[2,1-d]pyrimidine and of 10.9 g. ethyl chloropropionate is heated under reflux in 200 cc. of anhydrous isopropanol during 2 hours. The solvent is then removed and the residue is washed with 200 cc. of 0.1 N caustic soda. The residue is extracted with alcohol and the alcohol solution is concentrated to dryness. The residue melts at 118–122° C. after recrystallisation in a mixture of benzene and petroleum ether.

EXAMPLE 7

Preparation of 1-H-9-cyano-1-(γ-hydroxy-propyl)-indeno[2,1-d]-pyrimidine and 3-H-9-cyano-3-(γ-hydroxy-propyl)-indeno[2,1-d]-pyrimidine 5.8 g. (0.03 mole) of 1-H-9-cyano-indeno[2,1-d]pyrimidine are dissolved in 150 cc. of 0.5 N caustic soda. 8.5 g. (0.09 mole) of trimethylene chlorhydrin are added. The mixture is heated with stirring at 80° C. during 2 hours. After cooling, the alkaline solution is extracted with chloroform. The organic solution is dried and concentrated to dryness. The residue is treated with chloroform and the chloroform solution is chromatographed on alumina.

A first isomer melting at 170–171.5° C. after recrystallisation in a mixture of benzene and petroleum ether is obtained by elution with chloroform.

Analysis.—Found: C=71.30%; H=5.4%; N=16.99%. Calculated: C=71.69%; H=5.21%; N=16.72%.

By elution of the alumina column with methanol, a black residue is obtained. This residue is extracted with chloroform and the solution is filtered on a filter aid such as silicagel. The filtrate is concentrated to dryness and the residue is recrystallised in a mixture of benzene and petroleum ether. M.P. 194–195° C. (Yield: 30%.)

Analysis.—Found: C=71.35%; H=5.39%; N=16.95%. Calculated: C=71.69%; H=5.21%; N=16.72%.

EXAMPLE 8

Preparation of 1-H-9-cyano-1-(δ-hydroxybutyl)-indeno[2,1-d]pyrimidine and 3-H-9-cyano-3-(δ-hydroxybutyl)-indeno[2,1-d]-pyrimidine 4.3 g. (0.02 mole) of the sodium salt of 1-H-9-cyano-indeno[2,1-d]pyrimidine are refluxed in 100 cc. of anhydrous isopropanol containing 0.2 mole of 1-chloro-4-hydroxy butane.

Before adding this reagent, the pH is adjusted by adding sodium isopropylate in isopropanol.

The mixture is heated under reflux during three hours. The solvent is then removed and the residue is washed with 100 cc. of 0.1 N caustic soda. The residue is dried and treated with chloroform. Two isomers are isolated by chromatography on a column of basic alumina and by elution with chloroform.

EXAMPLE 9

Preparation of 1-H-9-cyano-1-(β-hydroxyethyl)-indeno[2,1-d]-pyrimidine and 3-H-9-cyano-1-(β-hydroxyethyl)-indeno[2,1-d]-pyrimidine 9.46 g. (0.049 mole) of 1-H-9-cyano-indeno[2,1-d]pyrimidine are dissolved in 32 cc. of 2 N caustic soda and 120 cc. of water. 16 cc. of β-chloroethanol (0.24 mole) are added to the reaction mixture. This mixture is then heated under reflux with stirring during 3 hours. During the heating period, the pH is maintained at 10–11 by additions of caustic soda. After cooling, the insoluble material is filtered and washed with water. The water phase is extracted with chloroform. The chloroform extracts and the insoluble material are combined. After evaporation of the chloroform, 9.9 g. of a mixture of isomers is obtained. Yield: 85%.

The two isomers are separated by fractional crystallisation in ethanol.

Analysis.—Found (1st isomer): C=70.67%; H=5.07%; N=17.47%. M.P.: 161–163° C. Found (2nd isomer): C=70.79%; H=4.51%; N=17.62%. M.P.: 257–258.5° C. Calculated: C=70.86%; H=4.65%; N=17.71%.

EXAMPLE 10

1-H-9-cyano-1-methylene-cyano-indeno-[2,1-d]-pyrimidine and 3-H-9-cyano-3-methylene-cyano-indeno-[2,1-d]-pyrimidine 6.45 g. of the sodium salt of 1-H-9-cyano-indeno-[2,1-d]-pyrimidine and 2.49 g. of chloroacetonitrile are heated under reflux in 120 cc. of isopropyl alcohol. After removing the alcohol, the residue is taken up in 100 cc. of 0.1 N caustic soda. After filtration, washing with water and drying, 3.2 g. of a crude product are obtained. The two isomers are separated by fractional recrystallisation in acetone.

EXAMPLE 11

Preparation of 1-H-9-cyano-1-(β-oxo-β-phenyl)ethylene-indeno[2,1-d]pyrimidine and 3-H-9-cyano-3-(β-oxo-β-phenyl)-ethylene-indeno-[2,1-d]-pyrimidine 4.3 g. of the sodium salt of 1-H-9-cyano-indeno-[2,1-d]pyrimidine and 3.4 g. of chloracetophenone are refluxed during 2 hours. After cooling and concentration to dryness, the residue is taken up in 100 cc. of 0.1 N caustic soda. After filtration, the residue is washed and dried. By fractional crystallisation in acetone, the two isomers are separated.

The first isomer (50%) melts at 246–266° C., whereas the second isomer (10%) melts at 236–246° C.

*Analysis.*—Found (1st isomer): C=77.13%; H=4.33%; N=13.65%; O=5.19%. Found (2nd isomer): C=77.36%; H=4.27%; N=13.59%; O=4.78%. Calculated: C=77.15%; H=4.29%; N=13.49%; O=5.14%.

EXAMPLE 12

*Preparation of 1-H-1-allyl-9-cyano-indeno-[2,1-d]-pyrimidine and 3-H-3-allyl-9-cyano-indeno-[2,1-d]-pyrimidine*

2.15 g. (0.01 mole) of the sodium salt of 1-H-9-cyano-indeno-[2,1-d]-pyrimidine and 9.9 cc. of allyl chloride are introduced in a reaction vessel containing 40 cc. of anhydrous isopropyl alcohol. The mixture is kept at the boil for 2 hours. One then evaporates the solvent to dryness under vacuum. The residue is washed with 50 cc. of 0.1 N caustic soda. The residue is again filtered, dried and extracted with benzene. The benzene solution is subjected to chromatography on a column (height: 17 cm., diameter: 3 cm.) of basic alumina. By elution, one obtains an orange-red band of a product melting at 150–153° C., after crystallisation in benzene. Yield: 30%.

*Analysis.*—Found: C=77.05%; H=4.50%; N=18.38%. Calculated: C=77.23%; H=4.75%; N=18.01%.

A second product (isomer) is obtained by elution with chloroform. After crystallisation in benzene, this isomer melts at 141.5–143° C. Yield: 35%.

*Analysis.*—Found: C=76.84%; H=4.75%; N=18.36%. Calculated: C=77.23%; H=4.55%; N=18.01%.

EXAMPLE 13

*Preparation of 1-H-1-benzyl-9-cyano-indeno-[2,1-d]-pyrimidine and 3-H-3-benzyl-9-cyano-indeno[2,1-d]pyrimidine*

These compounds are prepared as described in Example 12, except that 0.01 mole of benzyl chloride are used in place of allyl chloride.

The first isomer is obtained with a yield of 20%. It melts at 207–208.5° C. after recrystallisation in a mixture of benzene and petroleum ether.

*Analysis.*—Found: C=80.65%; H=4.46%; N=15.14%. Calculated: C=80.50%; H=4.62%; N=14.83%.

The second isomer is obtained with a yield of 25%. It melts at 190–191.5° C. after recrystallisation in a mixture of benzene and petroleum ether.

*Analysis.*—Found: C=80.50%; H=5.00%; N=14.48%. Calculated: C=80.50%; H=4.62%; N=14.83%.

EXAMPLE 14

*Preparation of 1-H-9-cyano-1-(methylene-4-pyridyl)-indeno-[2,1-d]-pyrimidine and 3-H-9-cyano-3-(methylene-4-pyridyl)-indeno-[2,1-d]-pyrimidine*

7.32 g. (0.034 mole) of the sodium salt of 1-H-9-cyano-indeno[2,1-d]-pyrimidine are added to 145 cc. of anhydrous isopropanol, to which 0.99 g. (0.430 mole) of sodium and 0.135 g. (0.375) mole of 4-chloromethylpyridine hydrochloride have been previously added.

The mixture is heated at reflux during 2 hours. The solvent is removed and the dry residue is washed with 100 cc. of 0.1 N caustic soda.

After filtration, the insoluble compound is dried and extracted with 500 cc. of chloroform. The residue is recrystallised in acetone, so as to obtain the first isomer of yellow-orange color melting at 268.5–275° C. Yield: 20%.

*Analysis.*—Found: C=75.98%; H=4.33%; N=19.72%. Calculated: C=76.03%; H=4.25%; N=19.70%.

The chloroform solution contains another isomer which is separated by chromatography and which melts at 233.5–235.5° C. Yield: 30%.

*Analysis.*—Found: C=76.04%; H=4.38%; N=19.67%. Calculated: C=76.03%; H=4.25%; N=19.70%.

EXAMPLE 15

*Preparation of 1-H-9-cyano-1-ethylcrotonate-indeno-[2,1-d]-pyrimidine and 3-H-9-cyano-3-ethylcrotonate-indeno-[2,1-d]-pyrimidine*

12.46 g. (0.057 mole of the sodium salt of 1-H-9-cyano-indeno-[2,1-d]-pyrimidine, and 16.4 g. (0.085 mole) of ethyl γ-bromocrotonate are heated at reflux in 200 cc. of anhydrous isopropanol. 5.4 g. of ether are added and the mixture is maintained under reflux during 1 hour. After cooling and filtering, the filtrate is concentrated and the residue is extracted with 400 cc. of chloroform. The filtrated chloroform solution is chromatographed.

6 g. (30%) of a first isomer melting at 194.5–196.5° C. are obtained.

*Analysis.*—Found: C=71.46%; H=4.93%;

N=13.63%

Calculated: C=70.8%; H=4.95%; N=13.76%.

The second isomer melts at 165–166.5° C. (yield: 10%).

*Analysis.*—Found: C=71.43%; H=5.05%;

N=13.80%

Calculated: C=70.8%; H=4.95%; N=13.76%.

EXAMPLE 16

*Preparation of 1-H-9-cyano-1-methylenecarbamyl-indeno-[2,1-d]-pyrimidine*

2.15 g. of the sodium salt of 1-H-9-cyano-indeno-[2,1-d]pyrimidine, 40 cc. of isopropyl alcohol and 1.03 g. of chloroacetamide are heated under reflux on the water bath for 1½ hours. By evaporation to dryness one obtains a residue which is twice washed with 50 cc. of a cold 2.5% Na₂CO₃ solution. One filters the precipitate, then one dries and recrystallises it in dioxane. Yield: 60%. M. Pt.: 289–291° C.

*Analysis.*—Found: C=66.55%; H=4.21%;

N=21.28%

Calculated: C=67.18%; H=4.02%; N=22.37%.

EXAMPLE 17

*Preparation of 1-H-9-cyano-1-dimethylaminopropyl-indeno-[2,1-d]-pyrimidine and 3-H-9-cyano-3-dimethylaminopropyl-indeno-[2,1-d]-pyrimidine*

3.476 g. (0.022 mole) of chlorhydrate of β-chloropropyldimethylamine are placed in 100 cc. of isopropyl alcohol, containing 0.022 mole of sodium isopropylate. One then adds 4.3 g. of the sodium salt of 1-H-9-cyano-indeno-[2,1-d]-pyrimidine.

The reaction mixture is heated under reflux on the water bath for 2 hours, after which the solvent is driven off under vacuum to dryness. The residue is taken up with 100 cc. of 2.5% sodium carbonate after which one filters. The precipitate recovered is washed with water, isolated and recrystallised in a benzene and petrol ether mixture. By recrystallisation of the 3.437 g. of product obtained, one isolates two products one different from the other (mixed M. Pt. 111–116° C.).

The first product, recrystallised from benzene, melts at 139–140° C.

*Analysis.*—Found: C=73.45%; H=6.61%;

N=20.24%

Calculated: C=73.35%; H=6.51%; N=20.13%.

The second product, recrystallised in benezne, melts at 139.5–140° C.

*Analysis*—Found: C=76.37%; H=6.56%;

N=17.39%

Calculated: C=73.35%; H=6.51; N=20.13%.

By treating the carbonated solution with ether, by drying the etherified solution and driving off the ether one recovers another 0.283 g. of the second product.

EXAMPLE 18

*Preparation of 1-H-9-cyano-1-dimethylaminoethyl-indeno-[2,1-d]-pyrimidine and 3-H-9-cyano-3-dimethylaminoethyl-indeno-[2,1-d]-pyrimidine*

2.15 g. (0.01 mole) of the sodium salt of 1-H-9-cyano-indeno-[2,1-d]-pyrimidine are dissolved in 50 cc. of anhydrous isopropyl alcohol, in which 0.253 g. of sodium has been previously dissolved. After addition of 1.584 g. of dimethyl-β-chloroethylamine hydrochloride, the mixture is refluxed during 2 hours. After cooling, the formed sodium chloride is filtered and the residue is taken in 100 cc. of 0.1 N NaOH. The suspension is stirred at room temperature and then filtered. The residue (1.25 g.) is recrystallised in a mixture of benzene and petroleum ether. A first isomer melting at 172.5–174° C. is obtained.

*Analysis.*—Found: C=73.00%; H=6.15%;

N=21.04%

Calculated: C=72.69%; H=6.10%; N=21.21%.

The second isomer is obtained by extraction with ether of the alkaline solution. M.P. 150–151° C.

*Analysis.*—Found: C=72.99%; H=5.86%;

N=21.21%

Calculated: C=72.69%; H=6.10%; N=21.21%.

These isomers have been converted in an acid addition salt, namely their hydrochlorides.

The amines are dissolved in a minimum of water and hydrochloric acid (pH:4.5–5). The crystallisation of the hydrochlorides is induced by adding a sufficient amount of ethanol to the aqueous solutions.

The hydrochloride of the first isomer melts at 241.5–243° C.

*Analysis.*—Found: C=63.53%; H=5.85%; N=18.36%; Cl=12.11%. Calculated: C=63.88%; H=5.69%; N=18.62%; Cl=11.78%.

The hydrochloride of the second isomer melts at 267–272° C.

*Analysis.*—Found: C=64.00%; H=5.80%; N=18.40%; Cl=11.29%. Calculated: C=63.88%; H=5.69%; N=18.62%; Cl=11.78%.

EXAMPLE 19

*Preparation of 1-H-9-cyano-1-dimethylaminoethyl-indeno-[2,1-d]-pyrimidine and of 3-H-9-cyano-3-dimethylaminoethyl-indeno-[2,1-d]-pyrimidine*

(a) In a first step, the following compounds are prepared: 1-H-9-cyano-1-(β-chlorethyl)-indeno-[2,1-d] - pyrimidine and 3-H-9-cyano - 3 - (β - chlorethyl) - indeno-[2,1-d]-pyrimidine.

7.84 g. (0.036 mole) of the sodium salt of 1-H-9-cyano-indeno-[2,1-d]-pyrimidine are refluxed during 90 hours in a mixture of 100 cc. of water and 140 cc. of ethanol. To the suspension, 6.4 cc. of 1,2-dichlorethane dissolved in a mixture of water and ethanol are then added, the pH of this latter solution being adjusted at 8.5–9. This addition is repeated at intervals of 24 hours.

When the reaction is completed, the reaction mixture is concentrated to dryness and the residue is treated with 0.1 N NaOH (300 cc.). The solution is stirred during half an hour, the temperature being maintained at 35–40° C.

After filtering, the insoluble material is dried and refluxed in 2 litres of benzene during 30 minutes. After filtration, the benzene solution is submitted to a chromatography and to a fractional crystallisation.

The following products are obtained:

First isomer (4.8 g.), M.P. 193–194° C.

*Analysis.*—Found: C=66.68%; H=4.02%; N= 16.21%; Cl=13.55%. Calculated: C=65.75%; H=3.94%; N=16.43%; Cl=13.87%.

Second isomer (1.3 g.), M.P. 193–194° C.

*Analysis.*—Found: C=66.11%; H=3.79%; N=16.35%; Cl=13.74%. Calculated: C=65.75%; H=3.94%; N=16.43%; Cl=13.87%.

(b) The first isomer (0.01 mole) is reacted in a pressure vessel at 200° C. during 10 hours with 25 cc. of an aqueous solution containing 30% of dimethylamine.

The 1-H-9-cyano-1-dimethylaminoethyl-indeno-[2,1-d]-pyrimidine melting at 150–151° C. is obtained with a yield of 55%.

(c) The 3-H-9-cyano - 3 - dimethylaminoethyl - indeno-[2,1-d]-pyrimidine melting at 172.5–174° C. is obtained with a yield of 48% from the second isomer obtained under section (a) of this example, by reaction of this second isomer with a dimethylamine.

EXAMPLE 20

*Preparation of 1-H-9-cyano-1-dimethylaminopropyl - indeno-[2,1-d]-pyrimidine and 3-H-9-cyano-3-dimethylaminopropyl-indeno-[2,1-d]-pyrimidine*

9.7 g. (0.045 mole) of the sodium salt of 1-H-9-cyano-indeno-[2,1-d]-pyrimidine, 1.19 g. (0.052 mole) of sodium and 7.9 g. (0.05 mole) of γ-chloropropyl-dimethylamine hydrochloride are reacted in 230 cc. of isopropanol as described in Example 18.

First isomer (3.5 g.) melting at 149–150° C. after recrystallisation in benzene.

*Analysis.*—Found: C=73.45%; H=6.61%; N=20.24%. Calculated: C=73.35%; H=6.51%; N=20.13%.

Second isomer (2.5 g.) melting at 139.5–140° C. after recrystallisation in benzene.

This isomer crystallises with ½ molecule of benzene.

*Analysis.*—Found: C=76.37%; H=6.56%; N=17.39%. Calculated: C=75.6%; H=6.66%; N=17.6%.

EXAMPLE 21

*Preparation of 1-H-9-cyano-1-dimethylaminopropyl - indeno-[2,1-d]-pyrimidine and 3-H-9-cyano-3-dimethylaminopropyl-indeno-[2,1-d]-pyrimidine*

(a) In a first step, the following compounds are prepared: 1-H-9-cyano-1-(γ-chloropropyl)-indeno - [2,1 - d]-pyrimidine and 3-H-9-cyano-1-(γ-chloropropyl) - indeno-[2,1-d]-pyrimidine.

These isomers may be prepared by two processes:

(1) 56.5 g. (0.26 mole) of the sodium salt of 1-H-9-cyano-indeno-[2,1-d]-pyrimidine are refluxed in 1 litre of anhydrous acetone, in the presence of 81.8 g. (0.52 mole) of 1-chloro-3-bromopropane during 3 hours.

After filtration, the solution is concentrated to a volume of 150 cc. The precipitate is filtered. 36.82 g. of the first isomer are thus obtained.

The filtrate is concentrated to dryness and washed with 0.1 N caustic soda. The alkaline solution is filtered. A mixture (20.88 g.) of the two isomers is so obtained. Yield: 81%.

This mixture is refluxed in 200 cc. of benzene. 7.45 g. of the first isomer are precipitated, while the second isomer (9.76 g.) is crystallized in the filtrate.

The first isomer melts at 177–177.5° C. after crystallisation in a mixture of chloroform and acetone.

*Analysis.*—Found: C = 66.70%; H = 4.72%; N = 15.37%; Cl=12.93%. Calculated: C=66.79%; H=4.48%; N=15.58%; Cl=13.14%.

The second isomer melts at 150–151° C. after crystallisation in benzene.

*Analysis.*—Found: C = 66.65%; H = 4.47%; N = 15.38%; Cl=13.40%. Calculated: C=66.79%; H=4.48%; N=15.58; Cl=13.14%.

These isomers may also be prepared by reaction of the sodium salt of 1-H-9-cyano-indeno-[2,1-d]pyrimidine (4.3 g.) with δ-chloropropyl p-toluene sulphonate (0.022 mole) dissolved in acetone, the reaction mixture being refluxed during 20 hours.

(b) The first isomer is heated in a pressure vessel with dimethylamine (25 cc. of a 33% solution) at a temperature of 200° C. during 10 hours.

The hydrochloride of 1-H-9-cyano - 1 - propylene - dimethylamino-indeno[2,1-d]-pyrimidine melts at 231–235° C. after recrystallisation in a mixture of water and alcohol.

*Analysis.*—Found: C = 64.71%; H = 6.27%; N = 17.49%; Cl=11.07%. Calculated: C=64.85%; H= 6.08%; H=17.79%; Cl=11.26%.

(c) The second isomer is also heated in a pressure vessel with dimethylamine (25 cc. of a 33% solution) at a temperature of 200° C. during 10 hours.

The hydrochloride of 3-H-9-cyano-3 - propylene - dimethylamino-indeno-[2,1-d] - pyrimidine melts at 222–223.5° C. after recrystallisation in a mixture of alcohol and water.

*Analysis.*—Found: C = 64.84%; H = 6.21%; N = 17.53%; Cl=11.01%. Calculated: C=64.85%; H= 6.08%; N=17.79%; Cl=11.26%.

EXAMPLE 22

*Preparation of 1-H-9-cyano-1-N-pyrrolidinoethyl-indeno-[2,1-d]-pyrimidine and 3-H-9-cyano-3-N-pyrrolidinoethyl-indeno-[2,1-d]-pyrimidine.*

These compounds are prepared as described in Example 18 from the sodium salt of 1-H-9-cyano-indeno-[2,1-d]-pyrimidine (6.7 g.; 0.035 mole), the N-β-chloroethylpyrrolidine hydrochloride (0.039 mole) sodium (0.04 mole) and isopropanol (130 cc.).

The first isomer melts at 159.5–160.5° C. after recrystallisation in benzene and petroleum ether. Yield: 58%.

*Analysis.*—Found: C = 74.80%; H = 6.30%; N = 18.80%. Calculated: C = 74.45%; H = 6.24%; N = 19.29%.

The second isomer melts at 170–171° C. after recrystallisation in benzene. Yield: 10%.

*Analysis.*—Found: C = 74.71%; H = 6.07%; N = 19.23%. Calculated: C = 74.45%; H = 6.24%; N = 19.29%.

The same isomers may be prepared by the same process, using caustic soda (pH: 13) in place of isopropanol and refluxing the reaction mixture during 1 hour. Yield: 38% of the first isomer and 34% of the second isomer.

EXAMPLE 23

*Preparation of 1-H-9-cyano-1 - N-pyrrolidinomethyl - indeno-[2,1-d]-pyrimidine and 3-H-9-cyano-3-ethylene-N-pyrrolidinomethyl-indeno-[2,1-d]-pyrimidine.*

(1) 0.05 mole of 1-H-9-cyano-1-(β-chloroethyl)-indeno[2,1-d]-pyrimidine are refluxed during 24 hours in 15 cc. of a mixture (50:50) of acetone and alcohol, in the presence of 0.005 mole of potassium iodide and 0.01 mole of potassium carbonate. 0.005 mole of pyrrolidine in 15 cc. of a mixture (50:50) of acetone and alcohol are dropped in the reaction mixture.

The first isomer melts at 159.5–160.5° C. The hydrochloride thereof melts at 234–235° C.

*Analysis.*—Found: C = 66.15%; H = 6.06%; N = 17.14%; Cl = 10.85%. Calculated: C = 66.94%; H = 6.27%; N=16.50%; Cl=10.48%.

(2) 0.05 mole of 3-H-9-cyano-3-(β-chloroethyl)-indeno-[2,1-d]-pyrimidine are refluxed during 24 hours in 15 cc. of a mixture (50:50) of acetone and alcohol, in the presence of 0.005 mole of potassium iodide and 0.01 mole of potassium carbonate. 0.005 mole of pyrrolidine in 15 cc. of a mixture (50:50) of acetone and alcohol are dropped in the reaction mixture.

The second isomer melts at 170–171° C. The hydrochloride thereof melts at 269–272° C.

*Analysis.*—Found: C = 66.51%; H = 6.31%; N = 16.75%; Cl = 10.21%. Calculated: C = 66.94%; H = 6.27%; N=16.50%; Cl=10.48%.

EXAMPLE 24

*Preparation of 1-H-9-cyano-1-diethylaminoethyl-indeno-[2,1-d] - pyrimidine and 3-H-9-cyano-3-diethylaminoethyl-indeno-[2,1-d]-pyrimidine*

The compounds are prepared as described in Example 18, from the sodium salt of 1-H-9-cyano-indeno-[2,1-d]-pyrimidine (7.4 g.; 0.034 mole), β-chloroethyldimethylamine hydrochloride (0.038 mole), sodium (0.042 mole) and anhydrous isopropanol (170 cc.). Duration of reflux heating: 2 hours.

The first isomer melts at 143.5–145.5° C. after recrystallisation in a mixture of benzene and petroleum ether.

*Analysis.*—Found: C = 73.64%; H = 7.02%; N = 19.25%. Calculated: C=73.9%; H=6.85%; N=19.3%.

The second isomer melts at 97–100.5° C. after recrystallisation in ether.

*Analysis.*—Found: C = 73.65%; H = 6.96%; N = 19.4%. Calculated: C=73.9%; H=6.85%; N=19.3%.

The isomers may also be prepared by the same process, using caustic soda (pH:13) in lieu to isopropanol.

The hydrochloride of the first isomer melts at 210–211.5° C. after recrystallisation in ethanol.

*Analysis.*—Found: C = 65.74%; H = 6.62%; N = 16.74%; Cl=11.08%. Calculated: C=65.74%; H= 6.43%; N=17.04%; Cl=10.7%.

The hydrochloride of the second isomer melts at 234.5–244.5° C. after recrystallisation in a mixture of alcohol and water.

*Analysis.*—Found: C = 65.93%; H = 6.13%; N = 16.89%; Cl=10.88%. Calculated: C=65.74%; H= 6.43%; N=17.04%; Cl=10.7%.

EXAMPLE 25

*Preparation of 1-H-9-cyano-1-dibutylaminopropyl-indeno-[2,1-d] - pyrimidine and 3-H-9-cyano-3-dibutylaminopropyl-indeno-[2,1-d]-pyrimidine*

(a) These compounds may be prepared by the process described in Example 18, using the sodium salt of 1-H-9-cyano-indeno-[2,1-d]-pyrimidine (9.46 g.; 0.044 mole), γ-chloropropyl dibutylamine (9.47 g.; 0.046 mole), sodium (0.043 mole) and isopropanol (170 cc.).

The first isomer melts at 52–54° C. after recrystallisation in a mixture of benzene and petroleum ether.

*Analysis.*—Found: C = 75.98%; H = 8.42%; N = 15.95%. Calculated: C=76.20%; H=8.34%; N= 15.46%.

The second isomer melts at 182–184° C.

*Analysis.*—Found: C = 76.00%; H = 8.45%; N = 15.60%. Calculated: C=76.20%; H=8.34%; N= 15.46%.

(b) The 1-H-9-cyano-1 - dibutylaminopropyl - indeno-[2,1-d] - pyrimidine and 3-H-9-cyano - 3 - dibutylaminopropyl-indeno-[2,1,d]-pyrimidine may also be prepared from 11.6 g. (0.06 mole) of 1-H-9-cyano-indeno-[2,1-d]-pyrimidine, 13.35 g. (0.065 mole) of γ-chloropropyl-dibutylamine and 200 cc. of 0.5 N NaOH, the mixture being heated at 83–85° C. and stirred during 2 hours.

(c) The two isomers may also be prepared respectively from 1-H-9-cyano-1-(γ-chloropropyl)-indeno-[2,1-d]-pyrimidine and 3-H-9-cyano - 3 - (γ-chloropropyl)-indeno-[2,1-d]-pyrimidine, by reacting these compounds with N-dibutylamine.

The hydrochloride of the first obtained isomer melts at 182–184° C., whereas the hydrochloride of the second isomer melts at 210–212° C.

EXAMPLE 26

*Preparation of 1-H-9-cyano-1-dipropylaminopropyl-indeno-[2,1-d]pyrimidine and 3-H-9-cyano - 3 - dipropylaminopropyl-indeno-[2,1-d]-pyrimidine*

(a) These compounds may be prepared by the process described in Example 18, using the sodium salt of 1-H-9-cyano-indeno-[2,1-d]-pyrimidine (10.08 g.; 0.046 mole), dipropylamine (8.9 g.) and isopropanol (190 cc.).

The first isomer (60%) melts at 74–77.5° C.

*Analysis.*—Found: C = 75.58%; H = 7.64%; N = 16.47%. Calculated: C=75.41%; H=7.84%; N=16.75%.

The second isomer (20%) melts at 80–89° C. after recrystallisation in ethyl acetate and cyclohexane.

*Analysis.*—Found: C = 75.59%; H = 7.64%; N = 16.47%. Calculated: C=75.41%; H=7.84%; N=16.75%.

(*b*) The same compounds may also be prepared respectively from 1-H-9-cyano-1-(γ-chloropropyl)-indeno-[2,1-d]-pyrimidine, and 3-(γ-chloropropyl)-indeno-[2,1-d]-pyrimidine, by reacting these compounds with dipropylamine.

The hydrochloride of the first obtained isomer melts at 248.5–254.5° C.

*Analysis.*—Found: C = 68.29%; H = 7.12%; N = 14.96%; Cl=9.75%. Calculated: C=67.99%; H=7.33%; N=15.10%; Cl=9.55%.

The hydrochloride of the second isomer melts at 180.5–183.5° C. after recrystallisation in a mixture of chloroform and petroleum ether (60–80° C.).

*Analysis.*—Found: C = 67.22%; H = 7.26%; N = 14.59%; Cl=10.1%. Calculated: C=67.99%; H=7.33%; N=15.10%; Cl=9.55%.

EXAMPLE 27

*Preparation of 1 - H - 9 - cyano-1-N-morpholinopropyl-indeno - [2,1-d] - pyrimidine and 3-H-9-cyano-3-N-morpholinopropyl-indeno-[2,1-d]-pyrimidine*

These compounds may be prepared by the process described in Example 18, using the sodium salt of 1-H-9-cyano-indeno-[2,1-d]-pyrimidine (10.62 g.; 0.0493 mole), N-γ-chloropropyl-morpholine (8.5 g.; 0.0517 mole) and anhydrous isopropyl alcohol (185 cc.).

The first isomer melts at 163–166° C. after recrystallisation in benzene.

*Analysis.*—Found: C = 71.16%; H = 6.33%; N = 17.69%; O = 4.82%. Calculated: C = 71.22%; H = 6.29%; N=17.49%; O=4.99%.

The second isomer melts at 155.5–158° C. after recrystallisation in ethanol.

*Analysis.*—Found: C = 70.96%; H = 6.34%; N = 17.56%; O = 5.14%. Calculated: C = 71.22%; H = 6.29%; N=17.49%; O=4.99%.

EXAMPLE 28

*Preparation of 1-H-9-cyano-1-N-piperidinopropyl-indeno-[2,1-d]-pyrimidine and 3-H-9-cyano-3-N-piperidinopropyl-indeno-[2,1-d]pyrimidine*

(*a*) These compounds may be prepared by the process described in Example 18, using the sodium salt of 1-H-9-cyano-indeno-[2,1-d]-pyrimidine (8.43 g.; 0.039 mole), γ-chloro-N-propylpiperidine (6.62 g.; 0.04 mole) and 200 cc. of anhydrous isopropanol.

One obtains 7.8 g. of the first isomer melting at 145–149° C. after recrystallisation in benzene.

*Analysis.*—Found: C = 75.98%; H = 6.84%; N = 15.92%. Calculated: C = 75.43%; H = 6.96%; N = 17.59%.

2.6 g. of the second isomer are also obtained. This second isomer melts at 180–183° C.

*Analysis.*—Found: C = 75.77%; H = 6.90%; N = 17.61%. Calculated: C = 75.43%; H = 6.96%; N = 17.59%.

(*b*) The same compounds may also be obtained by refluxing during 2 hours a mixture of 1-H-9-cyano-1-(γ-chloropropyl)-indeno-[2,1-d]-pyrimidine or 3-H-9-cyano-3-(γ-chloropropyl)-indeno-[2,1-d]-pyrimidine (0.005 mole) with piperidine (100 cc.). The excess of piperidine is removed and the residue is treated with diluted hydrochloric acid. After filtration, the solution is made alkaline and the amine is precipitated. These amines may be readily converted into an addition salt with hydrochloric acid.

The hydrochloride of the first isomer melts at 259–265° C. after recrystallisation in a mixture of alcohol and water.

*Analysis.*—Found: C = 67.00%; H = 6.69%; N = 16.06%; Cl=10.12%. Calculated: C=67.68%; H=6.53%; N=15.79%; Cl=9.99%.

The hydrochloride of the second isomer melts at 253–256.5° C., after recrystallisation in a mixture of ethanol and water.

*Analysis.*—Found: C = 66.88%; H = 6.58%; N = 16.08%; Cl=10.17%. Calculated: C=67.68%; H=6.53%; N=15.79%; Cl=9.99%.

EXAMPLE 29

*Preparation of 1-H-9-cyano-1-N-piperidinoethyl-indeno-[2,1 - d] - pyrimidine and 3-H-9-cyano-3-N-piperidinoethyl-indeno-[2,1-d]-pyrimidine*

These compounds may be prepared by the process described in Example 18, using the sodium salt of 1-H-9-cyano-indeno-[2,1-d]-pyrimidine (11.76 g.; 0.0547 mole); the hydrochloride of N-β-chloroethylpiperidine (11 g.; 0.06 mole), sodium (1.6 g.; 0.069 mole) and anhydrous isopropanol (210 cc.). 8.86 g. of the first isomer are obtained. M.P. 178–179.5° C. after recrystallisation in a mixture of benzene and cyclohexane.

*Analysis.*—Found: C = 74.64%; H = 6.74%; N = 18.42%. Calculated: C = 74.96%; H = 6.62%; N = 18.40%.

The second isomer is obtained with a yield of 40%. This compound melts at 113–117° C. after recrystallisation in benzene. It crystallises with ½ molecule of benzene.

*Analysis.*—Found: C = 76.67%; H = 6.80%; N = 16.41%. Calculated for $C_{19}H_{20}N_4 + \frac{1}{2}C_6H_6$: C= 76.93%; H=6.75%; N=16.31%.

The same compounds may also be prepared by the following process:

1.27 g. (0.005 mole) of 1-H-9-cyano-1-β-chloroethyl)-indeno-[2,1-d]-pyrimidine or 3-H-9-cyano-3-(β-chloroethyl)-indeno-[2,1-d]-pyrimidine are refluxed during 24 hours with 0.852 g. (0.01 mole) of pyridine, 1.38 g. (0.01 mole) of potassium carbonate and 25 cc. of anhydrous benzene. The benzene is removed and the residue is dissolved in 50 cc. of 0.5 N hydrchloric acid. The acid solution is made alkaline and the precipitate is recrystallised in benzene.

I claim:

1. A compound of the formula

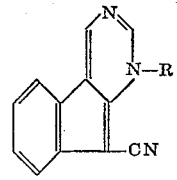

wherein R is alkylene-amino of the formula

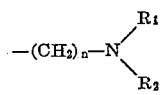

in which $n$ is a whole number from 2 to 4, and each of $R_1$ and $R_2$ is alkyl with 2 to 4 carbon atoms .

2. The hydrochloride of a compound of the formula

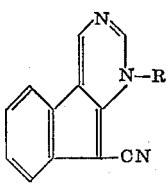

wherein R is alkylene-amino of the formula

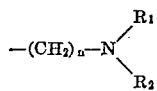

in which n is a whole number from 2 to 4, and each of $R_1$ and $R_2$ is alkyl with 2 to 4 carbon atoms.

3. A compound of the formula

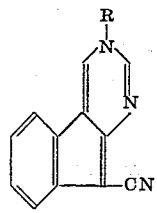

wherein R is alkylene-amino of the formula

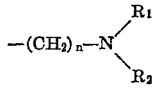

in which n is a whole number from 2 to 4, and each of $R_1$ and $R_2$ is alkyl with 2 to 4 carbon atoms.

4. The hydrochloride of a compound of the formula

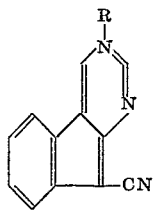

wherein R is alkylene-amino of the formula

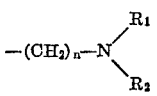

in which n is a whole number from 2 to 4, and each of $R_1$ and $R_2$ is alkyl with 2 to 4 carbon atoms.

5. A compound of the formula

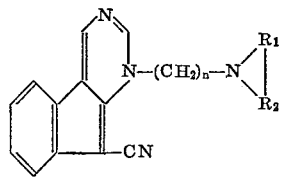

in which n is a whole number from 2 to 4, and

a member selected from the group consisting of morpholino, pyrrolidino and piperidino.

6. The hydrochloride of a compound of the formula

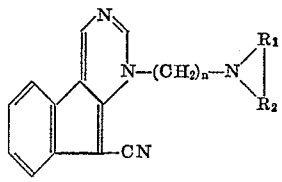

in which n is a whole number from 2 to 4, and

a member selected from the group consisting of morpholino, pyrrolidino and piperidino 7. A compound of the formula

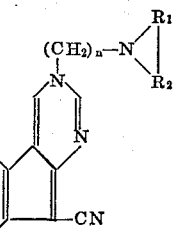

in which n is a whole number from 2 to 4, and

is a member selected from the group consisting of morpholino, pyrrolidino and piperidino.

8. The hydrochloride of a compound of the formula

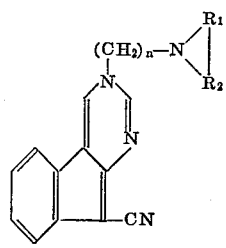

in which n is a whole number from 2 to 4, and

is a member selected from the group consisting of morpholino, pyrrolidino and piperidino.

9. 1-H-9-cyano-1-(β-dimethylaminoethyl) - indeno[2,1-d]-pyrimidine.

10. 3-H-9-cyano-3-(β-dimethylaminoethyl) - indeno[2,1-d]-pyrimidine.

11. 1-H-9-cyano-1-(γ-dimethylaminopropyl) - indeno-[2,1-d]-pyrimidine.

12. 3-H-9—cyano-3 - (γ - dimethylaminopropyl) - indeno[2,1-d]-pyrimidine.

13. 1-H-9-cyano-1-(β-N-pyrrolidinoethyl) - indeno[2,1-d]-pyrimidine.

14. 3-H-9-cyano-3-(β-N - pyrrolidinoethyl) - indeno[2,1-d]-pyrimidine.

15. 1-H-9-cyano-1-(β-diethylaminoethyl) - indeno[2,1-d]-pyrimidine.

16. 3-H-9-cyano-3 -(β-diethylaminoethyl) - indeno[2,1-[2,1-d]-pyrimidine.

17. 1-H-9-cyano-1-(γ-diethylaminopropyl) - indeno[2,1-d]-pyrimidine.

18. 3-H-9-cyano-3-(γ-dibutylaminopropyl) - indeno[2,1-d]-pyrimidine.

19. 1-H-9-cyano-1-(γ - dipropylaminopropyl) - indeno-[2,1-d]-pyrimidine.

20. 3-H-9-cyano - 3 -(γ-dipropylaminopropyl) - indeno-1-d]-pyrimidine.

21. 1-H-9-cyano-1-(γ-N - morpholinopropyl) - indeno-[2,1-d]-pyrimidine.

22. 3-H-9-cyano-3-(γ-N - morpholinopropyl) - indeno-[2,1-d]-pyrimidine.

23. 1-H-9-cyano-1-(γ-N-piperidinopropyl) - indeno-[2,1-d]-pyrimidine.

24. 3-H-9-cyano-3-(γ-N-piperidinopropyl) - indeno[2,1-d]-pyrimidine.

25. 1-H-9-cyano-1-(β-N-piperidinoethyl) - indeno[2,1-d]-pyrimidine.

26. 3-H-9-cyano-3-(β-N-piperidinoethyl) - indeno[2,1-d]-pyrimidine.

27. A member selected from the group consisting of the 1-H-9-cyano-indeno[2,1-d]-pyrimidines and 3-H-9-cyano-indeno[2,1-d]-pyrimidines of the formulae

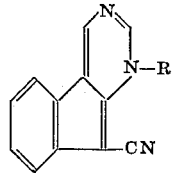

and

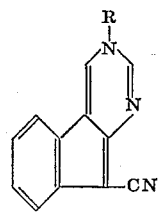

in which R is halo-alkylene of the formula:

—(CH$_2$)$_n$—X in which $n$ is a whole number from 2 to 4 and X is a halogen atom selected from the group consisting of bromine and chlorine.

No references cited.